US009409796B2

(12) United States Patent
Kirk et al.

(10) Patent No.: US 9,409,796 B2
(45) Date of Patent: Aug. 9, 2016

(54) GAS FLOTATION TANK

(71) Applicants: Todd William Kirk, Rockyview County, CA (US); Daniel Clifford Whitney, Cochrane, CA (US); Douglas Walker Lee, Calgary, CA (US)

(72) Inventors: Todd William Kirk, Rockyview County, CA (US); Daniel Clifford Whitney, Cochrane, CA (US); Douglas Walker Lee, Calgary, CA (US)

(73) Assignee: Exterran Water Solutions ULC, Calgary, Alberta (CA)

( * ) Notice: Subject to any disclaimer, the term of this patent is extended or adjusted under 35 U.S.C. 154(b) by 80 days.

(21) Appl. No.: 13/975,750

(22) Filed: Aug. 26, 2013

(65) Prior Publication Data

US 2015/0053600 A1 Feb. 26, 2015

(51) Int. Cl.
*B03D 1/24* (2006.01)
*C02F 1/24* (2006.01)
*B03D 1/14* (2006.01)
*B03D 1/02* (2006.01)

(52) U.S. Cl.
CPC ............... *C02F 1/24* (2013.01); *B03D 1/1406* (2013.01); *B03D 1/1412* (2013.01); *B03D 1/1462* (2013.01); *B03D 1/1493* (2013.01); *B03D 1/24* (2013.01); *B03D 1/028* (2013.01)

(58) Field of Classification Search
CPC ........ B03D 1/1406; B03D 1/1493; C02F 1/24
See application file for complete search history.

(56) References Cited

U.S. PATENT DOCUMENTS

| 2,211,565 | A | * | 8/1940 | Degenhardt et al. | 210/704 |
| 3,246,763 | A | * | 4/1966 | Baum | 210/221.2 |
| 3,831,758 | A | * | 8/1974 | Watson et al. | 210/199 |
| 5,766,484 | A | * | 6/1998 | Petit et al. | 210/703 |
| 6,758,972 | B2 | * | 7/2004 | Vriens et al. | 210/605 |
| 7,867,398 | B2 | * | 1/2011 | Harmon et al. | 210/604 |
| 8,080,158 | B2 | | 12/2011 | Lee et al. | |
| 8,475,663 | B2 | | 7/2013 | Lee et al. | |
| 2007/0114183 | A1 | * | 5/2007 | Lee et al. | 210/703 |
| 2011/0163040 | A1 | | 7/2011 | Lee et al. | |
| 2011/0297620 | A1 | * | 12/2011 | Lee et al. | 210/703 |

OTHER PUBLICATIONS

PCT—International Search Report and Written Opinion of the International Searching Authority dated Oct. 6, 2014.

* cited by examiner

*Primary Examiner* — Thomas M Lithgow
(74) *Attorney, Agent, or Firm* — Schiff Hardin LLP (57) ABSTRACT

A gas flotation tank is provided that includes a series of adjacent chambers which impart a rotational current therein. Each chamber is separated from a skim oil trough by a skimming weir. Each chamber comprises an alternating fluid communication device between adjacent chambers allowing fluid communication between adjacent chambers in the form of a communication port in the dividing wall between adjacent chambers and a chamber outlet in conjunction with a perforated plate and the outlet is positioned in fluid communication with the final chamber.

15 Claims, 9 Drawing Sheets

GAS FLOTATION TANK

FIELD OF THE INVENTION

The invention relates to gas flotation tanks for separating hydrocarbons from produced water and more specifically to gas flotation tanks with reduced structural and internal piping that prevent or at least mitigate short circuiting.

BACKGROUND

Gas flotation tanks are used to separate unwanted phases or contaminants such as hydrocarbons from produced water generally by allowing or facilitating the rising of the unwanted phases or contaminants to the surface of produced water. The hydrocarbons may then be removed via skimming of the surface of the produced water.

One typical gas flotation tank comprises of a number of chambers separated by a dividing wall but in fluid communication with each other. During operation, produced water is input into the tank and a rotational current is generated encouraging hydrocarbon to rise to the surface of the water while forcing cleaner more purified water towards the bottom of the tank. By passing the lower water to an adjacent chamber, each successive chamber contains produced water having a lower content of hydrocarbons until a desired purity level is reached and the water is output from the gas flotation tank. One problem with such a design is the need for heavily reinforced divider walls between each chamber of the gas flotation tank as fluid levels in each chamber can be unequal and the difference in fluid level can be significant enough to damage the divider wall and the tank. In addition, depending on the location of the fluid communication port between each divider wall of the tank, water can short circuit across the chambers resulting in water in the final chamber being output with a higher than desirable hydrocarbon content.

To avoid short circuiting, one gas flotation tank includes an interconnecting pipe to connect the chambers in series without creating a short circuit from the inlet to the outlet. The interconnecting pipe is located in such a way that the water considered to be cleanest is taken from one chamber to the next, released near the surface, and dispersed in a fashion (in conjunction with a water weir) to create a flow pattern and velocities that facilitate skimming of the surface hydrocarbon towards an oil skimming trough. The interconnecting pipe also acts as a region in which "micro-bubbles" may be introduced before entering subsequent chambers to ensure even mixing with flow going into each chamber.

However, the interconnecting pipe allows for, in an upset condition, for example an uncontrolled increase/decrease inlet flow, a large level difference that can collapse the internal walls hence requiring a need to heavily reinforce the tank. In order to minimize the risk of large level differences the interconnecting pipe size can be increased. However, such an increase can obstruct the flow pattern within the tank as well as reduce the working volume of the chamber thus rendering the tank less efficient. In addition, such an interconnecting pipe is limited by standard pipe and rolled plate sizes and associated costs and furthermore, filling and draining the tank is a delicate process that requires careful monitoring of the level in each chamber.

Another type of flotation tank is referred to as a serpentine tank and includes a number of chambers, each chamber separated by a partition wherein a portion of the partition is a perforated plate or opening, allowing for the balancing of the chambers. However, a serpentine tank allows only for horizontal flow through the tank, wherein gravity and time are used for the separation of the unwanted phases. The fluid in a serpentine tank flows substantially in one direction inside the chamber (lengthwise) and exits the chamber through the perforated plate, or open section, to the adjacent chamber where it flows horizontally the length of that chamber repeating for as many chambers as is provided in a given tank, hence the term "serpentine". This pattern of going end to end also creates the requirement for individual skimming points in each chamber, which would then also require additional nozzles on the tank, external piping, and valves for removing the unwanted phases.

A need therefore exists for a gas flotation tank that mitigates short circuiting while reducing or removing the dependency on interconnecting piping.

SUMMARY

A gas flotation tank for separating contaminants from fluid is provided. The tank includes a series of adjacent chambers which impart a rotational current therein through the use of a sloped weir in each chamber. Each chamber is separated from a skim oil trough by a skimming weir over which the contaminants passes. Each adjacent chamber is fluidly connected via an interconnecting passage that allows for the transfer of reduced contaminant fluid to an adjacent chamber for further contaminant reduction. An alternating setup of fluid passages and connector ports between adjacent chambers allows for at partial equalization of the fluid level between adjacent chambers and further mitigates, reduces or prevents short circuiting of the fluid as it passes from chamber to chamber.

In one non-limiting embodiment, there is provided a flotation tank for removing a contaminant from fluid input into the flotation tank, the flotation tank comprising;
 a floor defining a bottom of the tank and a depending wall defining the sides of the tank;
 a series of adjacent chambers within the tank separated from each other by dividing walls, each chamber comprising a sloped weir for inducing a rotational current within the chamber;
 a skim oil trough spanning each chamber and separated from each chamber by a skimming weir, the skimming weir opposite the sloped weir;
 an inlet in fluid communication with a chamber of the series of adjacent chambers for inputting a fluid comprising a contaminant, the inlet situated proximate the sloped weir of the series of adjacent chambers for inducing a rotational current to fluid input into the chamber;
 each chamber in fluid communication with the adjacent chambers via an interconnecting passage positioned substantially towards the bottom of the dividing wall of each chamber and substantially opposite the skim oil trough, the interconnecting passage allowing passage of fluid from a chamber to a backside of the sloped weir of the adjacent chamber;
 a connector port in the dividing wall between two adjacent chambers for providing fluid communication between the two adjacent chambers;
 a fluid passage in the sloped weir of at least one of the chambers of the series of adjacent chambers allowing for fluid transfer between adjacent chambers through the sloped weir of the at least one chamber; and
 an outlet in fluid communication with one of the chambers of the series of adjacent chambers outputting produced water;
 wherein the connector port and the fluid passage are situated in alternating adjacent chambers.

In a further embodiment of a flotation tank to that described above, the connector port is positioned in the base of the dividing wall proximate the skimming weir.

In a further embodiment of a flotation tank to that described above, the interconnecting passage is positioned at one end proximate the base of the sloped weir and at the other end in proximity to a backside of the sloped weir of the adjacent chamber.

In a further embodiment of a flotation tank to that described above, the fluid passage is positioned proximate the base of the sloped weir.

In a further embodiment of a flotation tank to that described above, the fluid passage is a perforated plate in the sloped weir.

In a further embodiment of a flotation tank to that described above, the outlet is positioned proximate the base of the wall of the final chamber.

In a further embodiment of a flotation tank to that described above, the inlet is positioned in the first chamber.

In a further embodiment of a flotation tank to that described above, each set of adjacent chambers comprises either a connector port or a fluid passage in alternating format allowing for equalization of the fluid level in adjacent chambers while preventing short circuiting of the fluid through the tank to the final chamber.

In a further embodiment of a flotation tank to that described above, the tank further comprises a manifold in fluid communication with each chamber for inputting or withdrawing fluid from the tank.

In a further embodiment of a flotation tank to that described above, the sloped weirs of the tank are aligned with one another in the adjacent chambers.

In a further embodiment of a flotation tank to that described above, the sloped weirs of the tank are offset with one another in at least two of the adjacent chambers.

In a further embodiment of a flotation tank to that described above, an upper edge of the skimming weir comprises at least one notch to promote transfer of the unwanted phase into the skim oil trough.

In a further embodiment of a flotation tank to that described above, the tank further comprises an inlet in fluid communication with each chamber for injecting a gas into the chamber, optionally in the form of micro-bubbles.

In a further embodiment of a flotation tank to that described above, the contaminant comprises hydrocarbon, emulsified oils, or heavy oils.

In a further embodiment of a flotation tank to that described above, the fluid is produced water.

DETAILED DESCRIPTION

Figure 1:
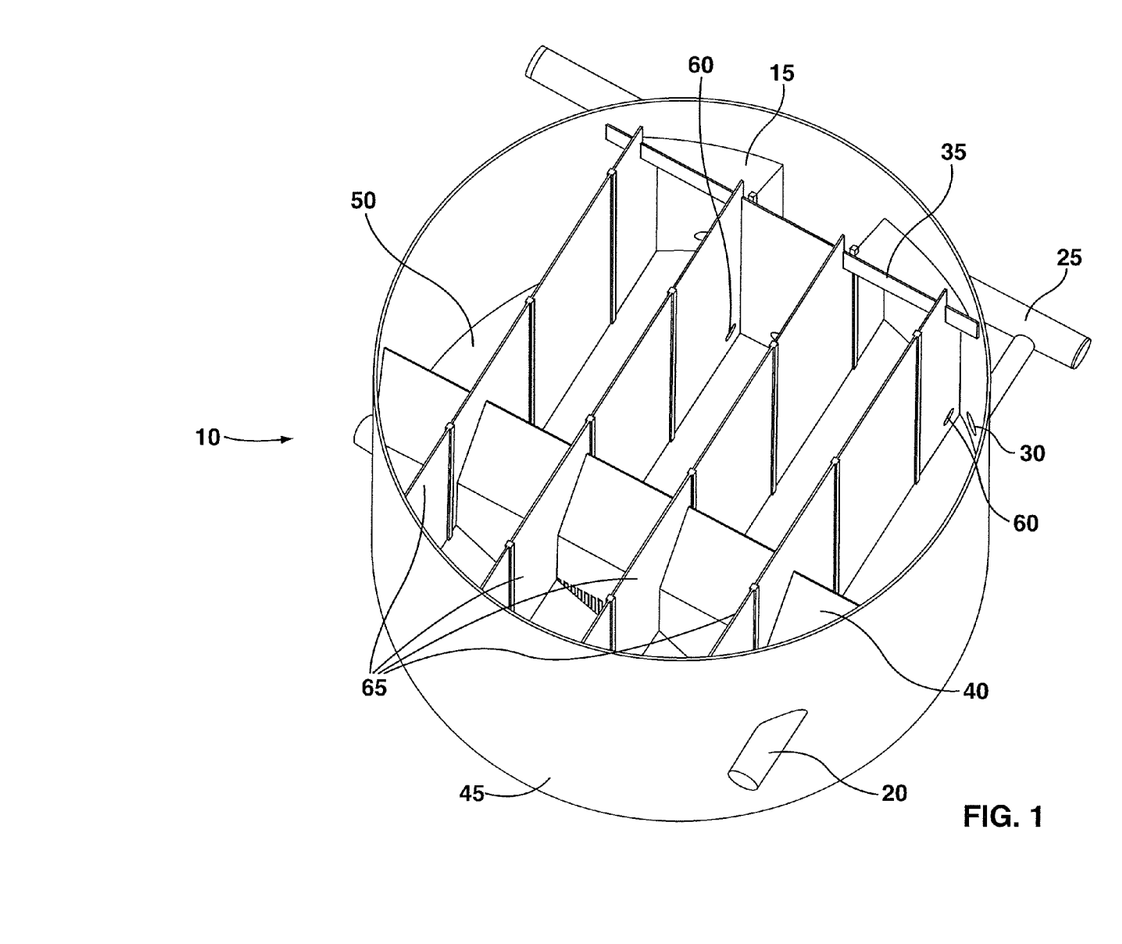
FIG. 1 is an isometric view of one illustrative embodiment of a gas flotation tank including five chambers.
Figure 2:
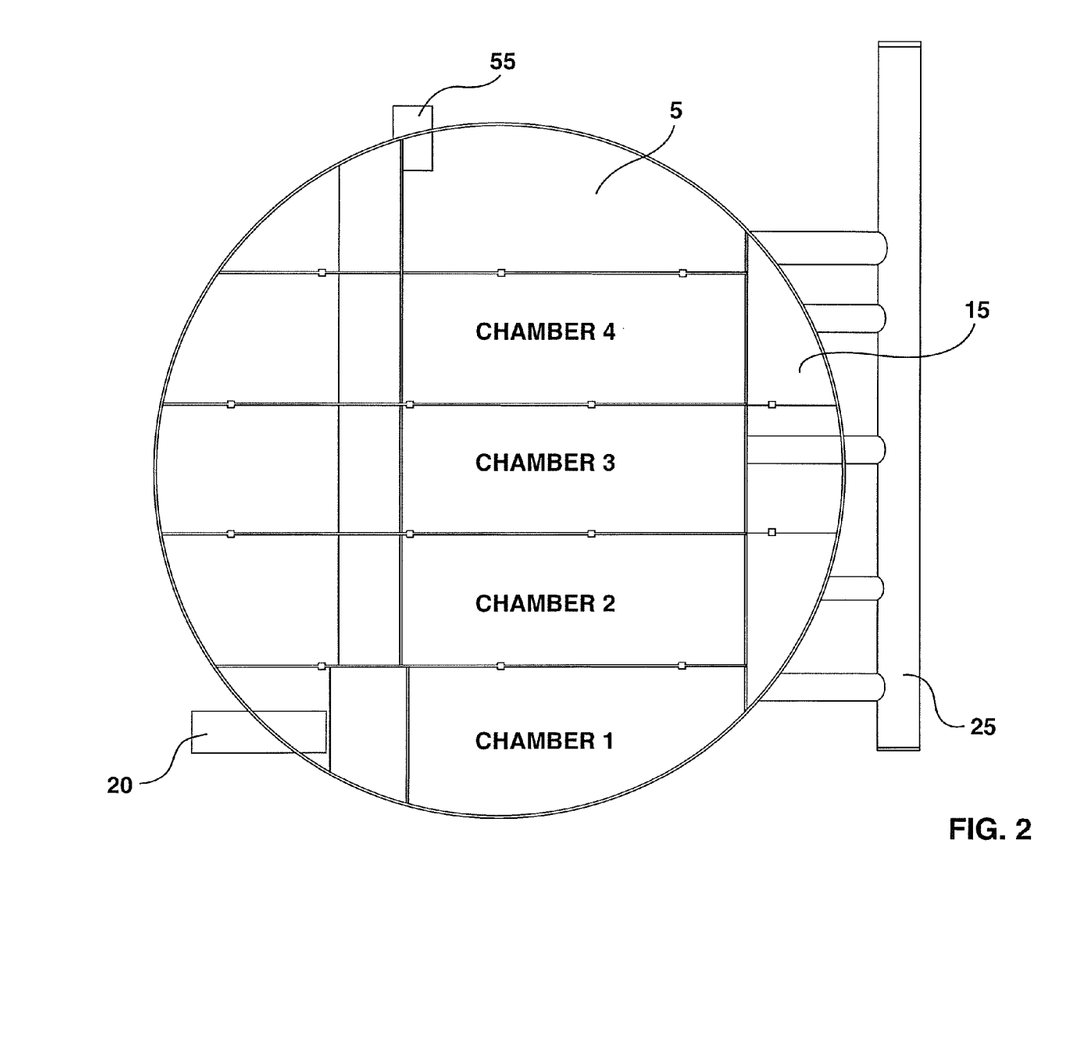
FIG. 2 is a top plan view of the gas flotation tank shown in FIG. 1.
Figure 3:
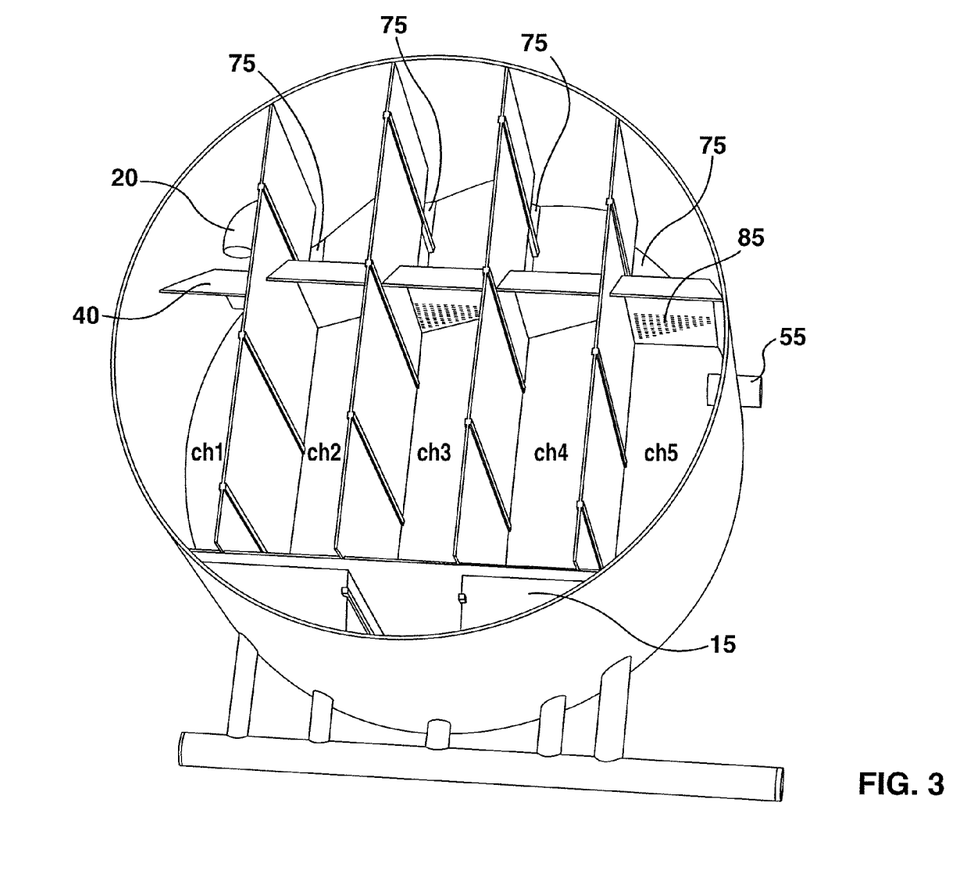
FIG. 3 is an isometric side view of the gas flotation tank shown in FIG. 1.
Figure 4:
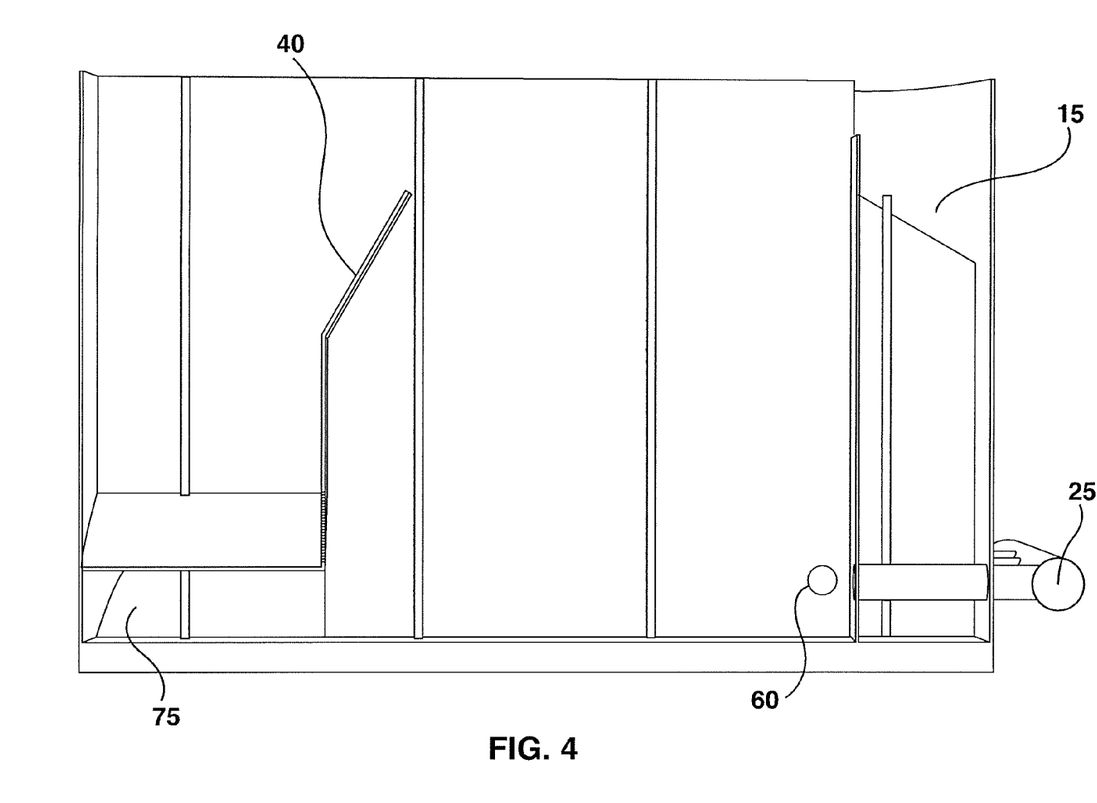
FIG. 4 is a cross sectional view of the gas flotation tank shown in FIG. 1 along the dividing wall between the first and second chamber.
Figure 5:
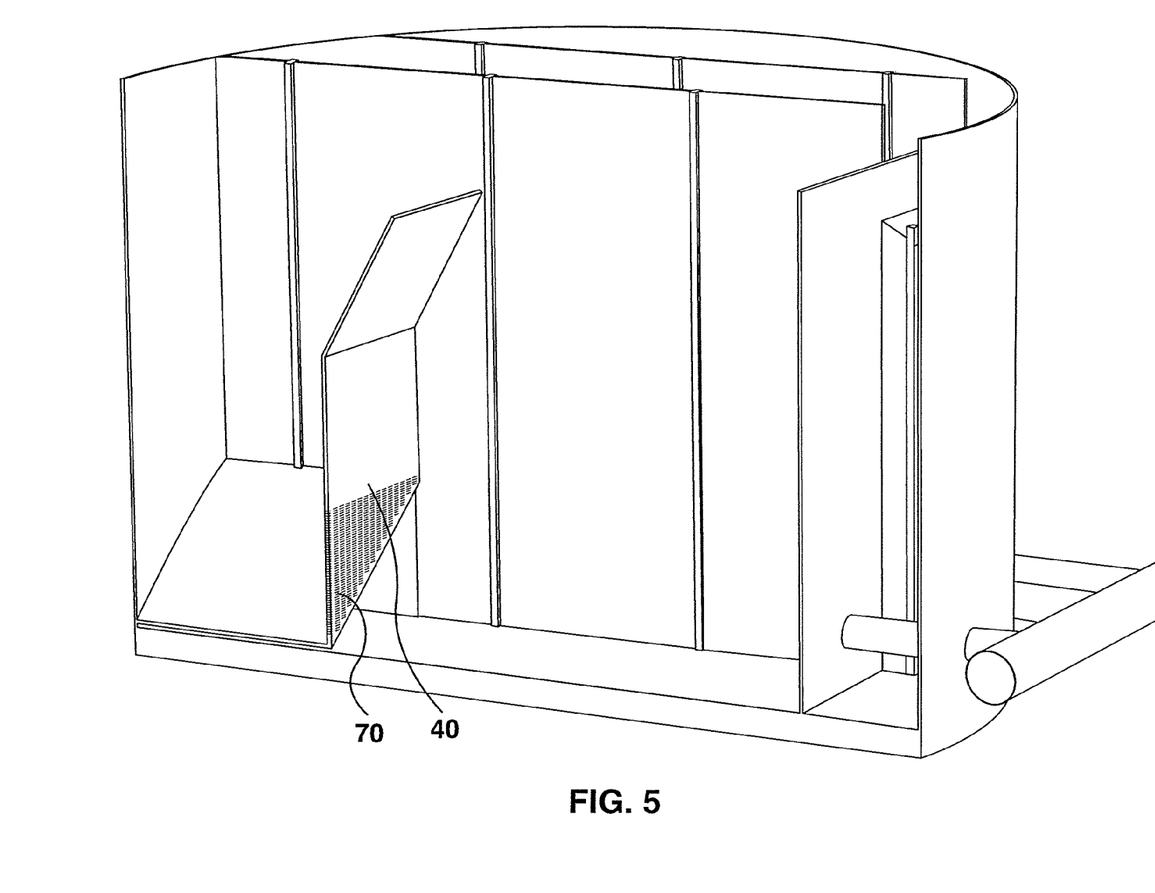
FIG. 5 is a cross sectional view of the gas flotation tank shown in FIG. 1 along the third chamber showing the perforated plate allowing for ingress of fluid from second chamber into the third chamber.
Figure 6:
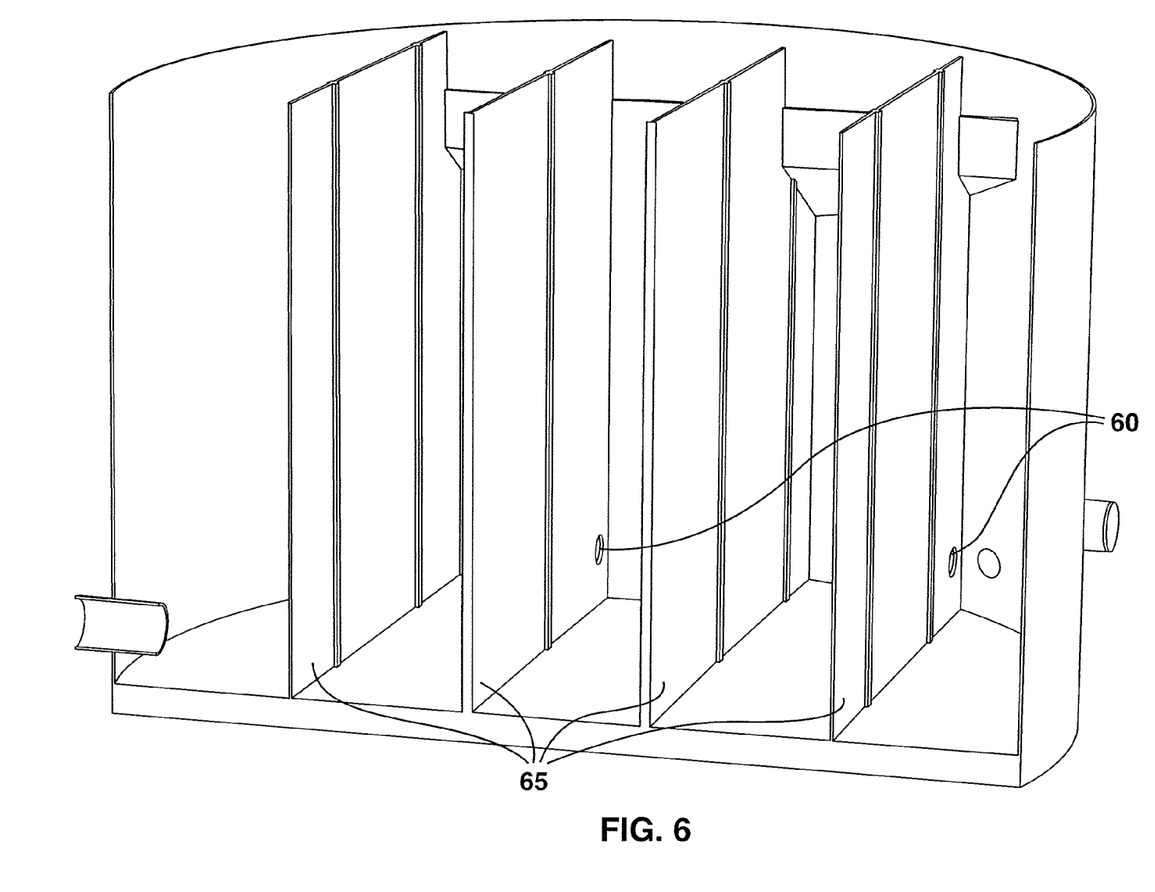
FIG. 6 is a cross sectional view of the gas flotation tank shown in FIG. 1 between the sloped weir and the skim oil trough showing the connecting ports between the first and second chamber and the third and fourth chamber allowing for fluid communication between these chambers and ingress of fluid from the first chamber into the second chamber and from the third chamber into the fourth chamber.
Figure 7:
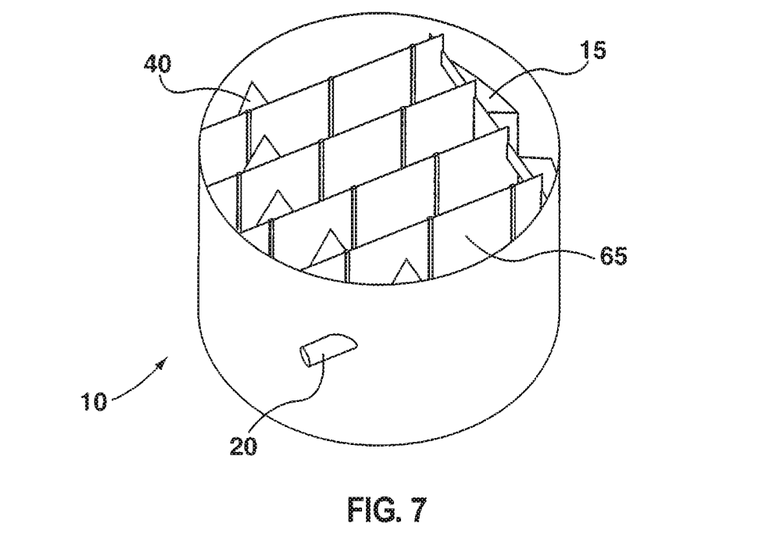
FIG. 7 is an isometric view of a further illustrative embodiment of a gas flotation tank including five chambers wherein the sloped weirs of the chambers are arranged at varying positions.

FIGS. 1 and 3 are isometric views of a non-limiting embodiment of a flotation tank such as a gas flotation tank for removing contaminants such as lighter than water hydrocarbon, such as oil, from a fluid such as produced water. The gas flotation tank is shown generally at 10 and is comprised of a tank floor 50 defining the bottom of the tank 10 and a pending tank wall 45 defining the periphery of the tank 10. The gas flotation tank 10 is divided into a plurality of sequential chambers for holding and imparting a generally rotational or circular current of the produced water in each individual chamber in a generally longitudinal direction of the chamber such that the surface of the fluid moves towards a skim oil trough 15 for capturing contaminant such as hydrocarbon or oil, from the surface of the fluid skimmed off the top of the fluid.

Figure 8:
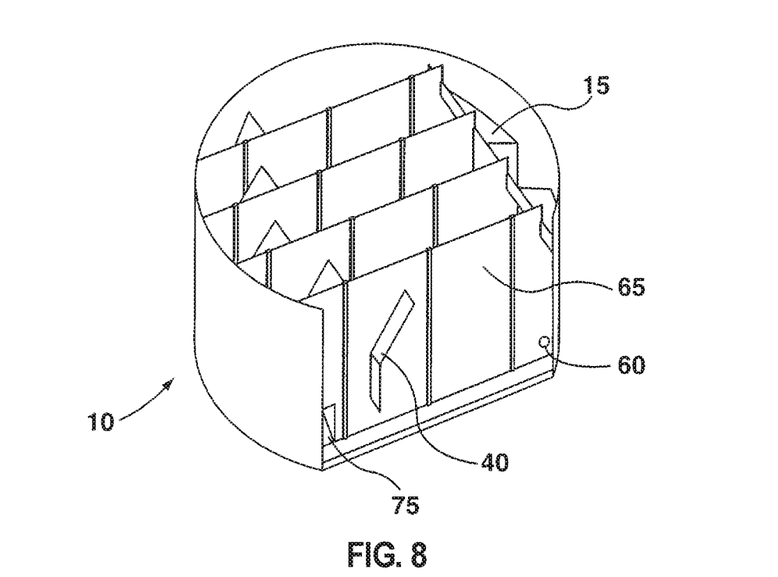
FIG. 8 is an isometric cross sectional view of the gas flotation tank shown in FIG. 7 along a divide of the first chamber.
Figure 9:
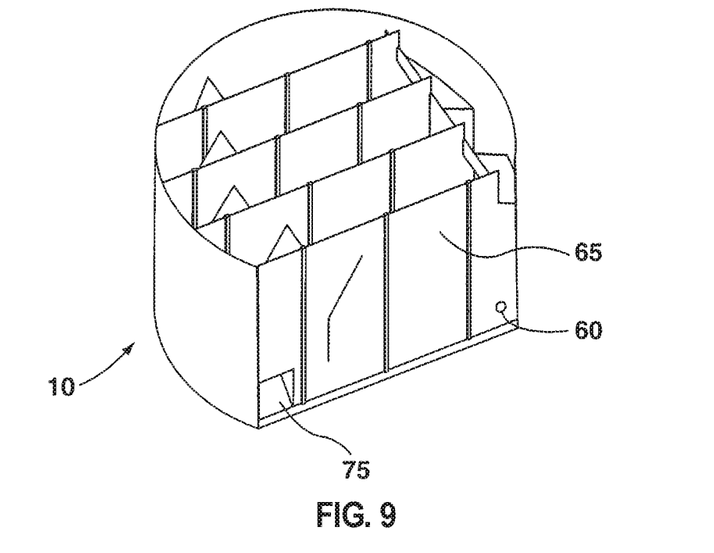
FIG. 9 is an isometric cross sectional view of the gas flotation tank shown in FIG. 7 along the dividing wall between the first and the second chamber.
Figure 10:
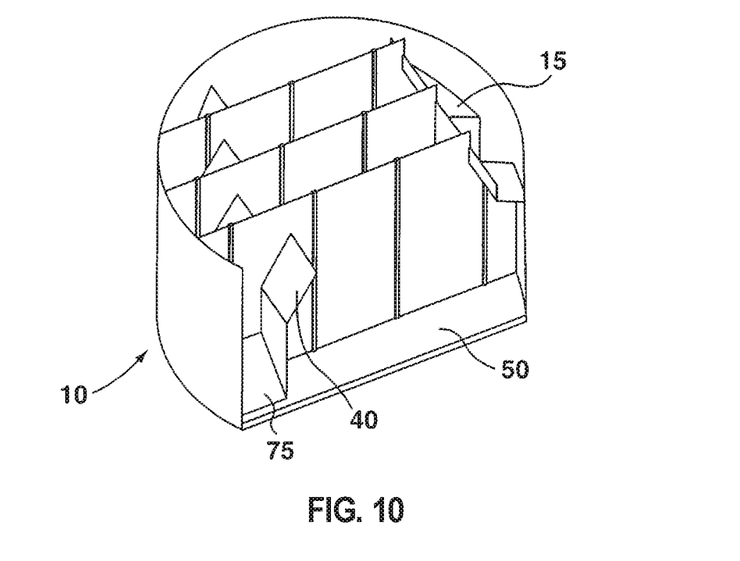
FIG. 10 is an isometric cross sectional view of the gas flotation tank shown in FIG. 7 along a divide of the second chamber.
Figure 11:
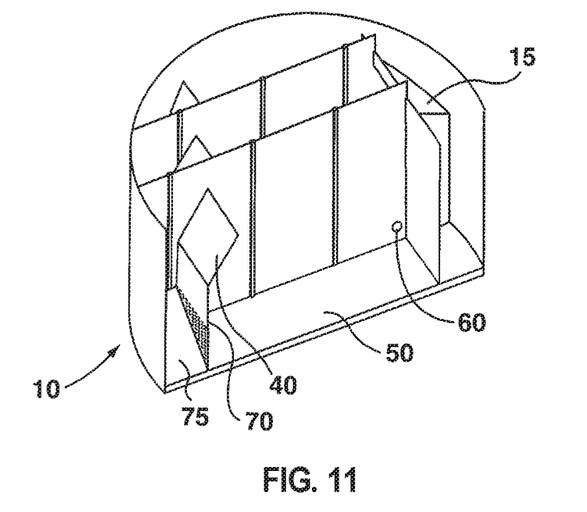
FIG. 11 is an isometric cross sectional view of the gas flotation tank shown in FIG. 7 along a divide of the third chamber.
Figure 12:
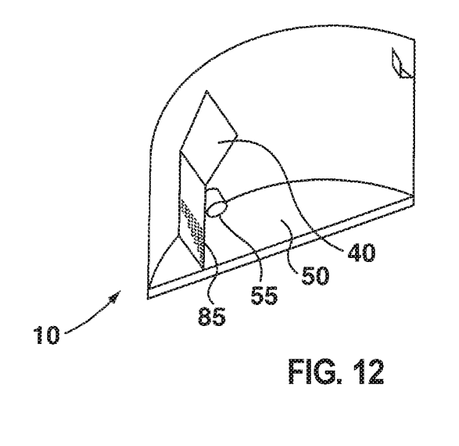
FIG. 12 is an isometric cross sectional view of the gas flotation tank shown in FIG. 7 along a divide of the fifth chamber.

A series of dividing walls 65 are used to define each chamber. Although the tank 10 shown throughout the figures contains five chambers, it will be appreciated that the tank may have fewer or additional chambers depending on the properties and rheology of produced water to be cleaned, the velocity of the fluid, the rate of purification, etc. Each chamber of the tank is connected to the adjacent chamber via an interconnecting passage 75 (shown in FIGS. 8 and 9) that allows for transfer of the fluid from one chamber to the next.

An inlet 20, generally positioned towards an upper region of the wall 45 is used to input contaminant containing fluid, such as produced water, into the tank 10 and into the first chamber of the tank 10. A sloped weir 40 bisects each of the chambers of the tank 10 for inducing the rotational or circular current in each individual chamber. Produced water is input into the first chamber from the inlet 20 in sufficient proximity to the sloped weir 40 to induce a rotational or circular current within the first chamber. It will be appreciated that a rotational current in the longitudinal direction of the chamber is induced by the sloped weir 40 that promotes the contaminant, such as lighter than water hydrocarbon, to rise to the surface of the water in the first chamber while the cleaner and thus heavier water is pushed downwards towards the floor 50 of the tank. A skimming weir 35 separates the chambers of the tank 10 from a skim oil trough 15 wherein contaminant, such as oil, is collected as it is skimmed over the weir from each of the chambers. In one non-limiting embodiment, the skimming weir 35 comprises a one or a plurality of V-shaped notches (not shown) in the upper end of the weir 35 to allow for oil to skim over the weir and into the skim oil trough 15. In an alternative non-limiting embodiment, the upper end of the skimming weir may included other shapes of notch to promote skimming of the unwanted phase into the skim oil trough 15 or may simply contain no notches on the upper end of the skimming weir. Once skimmed from the produced water, the oil may be collected using any suitable means.

To allow for more effective removal of contaminant via the skimming weir 35 into the skim oil trough 15, before the fluid is transferred to the adjacent chamber, the interconnecting passage 75 may be collect fluid from substantially the base of the sloped weir of a first chamber thereby allowing for increased flow path of the rotating fluid. The interconnecting passage 75 may then output the fluid into the adjacent chamber on a backside of the sloped weir 40 of the adjacent chamber. The input fluid into the adjacent chamber has a rotational current imparted thereon by the sloped weir and the fluid transfer onto the next adjacent chamber may be carried out in a similar manner. The interconnecting passage 75 may be formed with the slope weir 45 in combination with a baffle.

The first and the adjacent chamber, referred to as chamber two or the second chamber, may also be fluidly connected via a connecting port 60 situated in the lower region of their dividing wall 65. By positioning the connecting port 60 in the lower region of the dividing wall, cleaner water is transferred from the first chamber to the second chamber allowing for equalization of the fluid levels in these adjacent chambers. It will be appreciated that the cleaner water is water having a lower contaminant content than that input into the first chamber.

Once in the second chamber, a rotational current is again induced by a sloped weir 40 to promote the contaminant to rise to the surface of the fluid in the second chamber while the cleaner water is pushed downwards towards the floor 50 of the tank. Again, contaminant is skimmed from the second chamber into the skim oil trough 15 over the skimming weir 35 and the fluid in the second chamber is further purified relative the fluid in the first chamber.

It will be noted that there is no connecting port between the second and third chambers in order to avoid short circuiting of the fluid from the first chamber to the third chamber without a significant reduction in contaminant content. Avoiding short circuiting of the fluid through the tank increases the retention time in the tank and therefore generally allows for a greater reduction in contaminant via skimming from the top of the fluid in each chamber over the skimming weir 35 and into the skim oil trough 15.

By positioning the interconnecting passage 75 a suitable distance from the connecting port 60 the fluid must pass through sufficient rotational current to promote the rising of the contaminant to the surface before fluid is communicated from the second to the adjacent third chamber thereby providing fluid having a lower contaminant content to the adjacent third chamber while mitigating short circuiting.

To allow for equalization of the fluid levels between chambers wherein there is no connecting port, a fluid passage 70 is used to allow fluid to pass through the sloped weir 40 in the these chambers such as chamber 3. In this way, fluid is both transferred in the rotational current of the third chamber but can flow through fluid passage 70 in the event that difference in fluid levels between the second and third chamber is substantially different. As contaminant rises to the top of the chamber it is skimmed off the top and over the skimming weir 35 and into the skim oil trough 15 thereby reducing the contaminant content in the third chamber relative the second chamber.

It is the combination of a connecting port between the first and second chambers together with the interconnecting passage and the fluid passage that allows for both fluid transfer from chamber to adjacent chamber while mitigating short circuiting. This setup also allows for equalization of the fluid level in adjacent chambers reducing the risk of collapse of a divider wall. Once this alternating setup of connecting ports and fluid passages is established, any suitable number of chambers may be used in the flotation tank 10.

In one embodiment, as shown throughout the figures, the fluid passage 70 may be in the form of a perforated plate.

Furthermore, it will be appreciated that the sloped weir 40 may be positioned any various points in the chambers and it is not essential that the sloped weirs 40 be arranged in a line as shown in the FIGS. 1 to 6. For example, the sloped weirs 40 may be offset from one another as shown for example in the non-limited embodiments illustrated in FIGS. 7 to 12. By adjusting the positioning of the sloped weirs 40 the rate of the current in each chamber may be controlled and adapted as desired or as necessary.

The sloped weirs induce a rotational current within each chamber. The rotational current allows for a lengthened flow path throughout a tank relative a typical tank of the same diameter. The lengthened flow path allows for the separation of phases have a specific gravity (SG) approaching that of water such as emulsified oils and viscous fluids such as those used in AEOR polymer flooding. In addition, the increase in flow path allows for a greater opportunity for bubbles or micro-bubbles to come into contact substantially attach with contaminants in the fluid thereby gradually floating or bringing them to the surface for eventual skimming into the oil trough 15.

A manifold 25 in fluid communication with the chambers of the tank 10 may be used to fill or empty the tank 10 prior to operation or for maintenance of the tank 10 as needed.

The outlet 55 may be positioned in the final chamber of the tank 10 opposite the inlet chamber thereby allowing for the passage of the fluid through all of the chambers thus enabling the skimming of the contaminant in each chamber resulting in the greatest reduction of contaminant from the fluid being output from the tank.

FIGS. 2, 3, 4, 5 and 6 shows various views of the tank 10 and the fluid passages 70 and alternating connecting ports 60 allowing for fluid communication between adjacent chambers while mitigating short circuiting and allowing for at least partial equalization. As can be seen from the figures, an interconnecting pipe has been omitted from the tank 10. Such omission also allows for the omission of associated bypass lines and valves thereby reducing the complexity of the design and associated costs and maintenance. Further, scalability of the design is facilitated.

The design described herein allows for better handling of upset conditions as the flow from chamber to chamber is less restricted through the use of the interconnecting passage 75, connecting ports 60 as well as the fluid passage 70 and 85, respectively, which alternate between each chamber to avoid short circuiting while helping balance the fluid levels of the chambers while promoting contaminant removal through the avoidance of short circuiting.

The avoidance of the interconnecting pipe allows for the increased ability to build tanks capable of larger flows as the design offers a larger scalability. In addition, applications that require similar flows but longer retention times are also made possible.

In addition, situating the fluid passages 70 and/or 85 in the sloped weirs to create the interconnection between various chambers as well as the interconnecting passages 75 may also act to reinforce the tank, whereas an interconnecting pipe offers little to no structural benefit and also requires its own structural supporting incremental to what was required by the tank itself.

In addition to the benefits associated to operation of the tank 10, the tank 10 including the alternating setup of connecting ports 60 and fluid passages 70 and 85 is less sensitive to tank filling and draining as the interconnecting ports and fluid passages allow for less restricted flow from chamber to chamber. Alternating between fluid passages and connecting ports helps balance the fluid levels in adjacent chambers during filling and draining. As the fluid levels of adjacent chambers is substantially equalized, a reduction in structural requirements is observed relative to flotation tanks based on an interconnecting pipe setup.

It will be appreciated that the connector ports 60 and the fluid passages 70 and 85 should alternate from chamber to chamber to ensure that short circuiting is reduced or prevented while still allowing for at least partial equalization of the fluid level between adjacent chambers.

Further, reduced external piping and valves is required. Typically several external pipes are used for balancing during filling and draining in a setup that includes an interconnecting pipe. These are not required with the tank disclosed herein.

By utilizing the alternating setup outlined herein, a longer flow path is established that allows for removal of contaminant from the fluid input before reaching the outlet 55 in the final chamber. In addition, a significant component of the flow path is horizontal as opposed to vertical in typical designs. This horizontal flow path allows for bubbles or micro-bubbles to attach with contaminants to promote their rise to the surface of the rotational fluid for skimming off.

Charting chamber residence time against cumulative removal efficiency demonstrates that removal efficiency is increased as the number of sequential chambers increases. Indeed performance is a function of RT vs the number of sequential chambers (separators). Although the tank described herein comprised of five chambers, this relationship suggests that additional chambers should experience an increase in performance.

It will be appreciated that in addition to the rotational current induced by the sloped weirs 40, micro-bubbles may be added to each chamber via an inlet (not shown) to further promote the rising of the contaminant, such as hydrocarbon, to the surface for skimming off into the skim oil trough 15. The micro-bubbles may be added toward to base of the dividing wall, optionally in proximity to the connecting ports and act to adhere to the contaminant, such as oil, to promote the rising of the oil to the surface. A smaller bubble may be used to lower the rise velocity thereby increasing the opportunity for adherence to the contaminant. Micro-bubbles may alternatively or additionally be added at the base of the sloped weir 40.

In addition to using the interconnecting passage 75 to allow for transfer of fluid from one chamber to an adjacent chamber, the interconnecting passage 75, in an alternative non-limiting embodiment, may be used to transfer the liquid and also to concentrate the zone of gas/liquid contact of the contaminant to the bubbles or micro-bubbles. For example, the bubbles or micro-bubbles may be introduced in the interconnecting passage 75 instead of or in addition to introducing the bubbles or micro-bubbles in the chambers themselves. Such a setup of introducing the bubbles or micro-bubbles in a narrow zone allows for an improved probability of contact and attachment with the contaminant in the fluid. The introduction of gas may be concentrated to a more confined space, such as the interconnecting passage 75, and then released near the surface as it exits the interconnecting passage 75 where it can effectively be removed from the fluid. Typically, other technologies work on a principle of dispersing gas in a larger volume, for example within a chamber, as opposed to concentrating the gas into a narrow zone.

It will be appreciated that the gas flotation tank shown in FIGS. 7 to 12 operates in a similar manner to that described above with reference to FIGS. 1 to 6 with the difference that the sloped weirs 40 are offset from one another in the sequential chambers. As will be appreciated, by manipulating both the positioning of the sloped weirs and the slope of the weirs, the velocity profiles of the fluid may be altered to obtain a more desirable separation and/or removal of the unwanted phase or contaminant.

It will be appreciated that the present design utilizes an interconnecting passage to transfer the fluid from chamber to chamber and, generally, only use the fluid passages and connecting ports to balance the chambers, whereas a serpentine tank uses perforated plates or openings to transfer fluid from one chamber to the next. Further, the present design may use the interconnecting channels, typically comprised of baffles and weir plates, to create the rotational or circular flow pattern in each individual chamber. This is used to hydraulically skim the undesired contaminants and to bring them to the surface faster and giving them more opportunity to reach the surface more often (a result of the water weir plates and the circular pattern they induce). As the length of the flow path is considered to have an impact on the separation of contaminants including phases, separation may be achieve through the rotational or circular pattern in a smaller volume as opposed to using the length of the chamber (reusing a smaller volume several times in the circular pattern instead of flowing horizontally once through that volume). The result of these can be a reduction of required retention time which in turn dictates the volume (size) of the tank. In various embodiments, the tank as disclosed requiring $\frac{1}{6}$th to $\frac{1}{12}$th the time (or volume) for identical scenarios. The present design allows for a single (shared) skimming means represented by the skimming weir in combination with the skim oil trough, and a single point on the tank (nozzles, piping, and valves reduced) in which the unwanted contaminants may be removed.

It will be appreciated that various modifications and alterations may be made to the gas flotation tank which are within the scope and spirit of the invention.

We claim:

1. A flotation tank for removing a contaminant from fluid input into the flotation tank, the flotation tank comprising;
   a floor defining a bottom of the tank and a depending wall defining the sides of the tank;
   a series of adjacent chambers within the tank separated from each other by dividing walls, each chamber comprising a sloped weir for inducing a rotational current within the chamber;
   a skim oil trough spanning each chamber and separated from each chamber by a skimming weir, the skimming weir opposite the sloped weir;
   an inlet in fluid communication with a chamber of the series of adjacent chambers for inputting a fluid comprising a contaminant, the inlet situated proximate the sloped weir of the series of adjacent chambers for inducing a rotational current to fluid input into the chamber;
   each chamber in fluid communication with the adjacent chambers via an interconnecting passage positioned substantially towards the bottom of the dividing wall of each chamber and substantially opposite the skim oil trough, the interconnecting passage allowing passage of fluid from a chamber to a backside of the sloped weir of the adjacent chamber;

a connector port in one of the dividing walls between two adjacent chambers for providing fluid communication between the two adjacent chambers, and a dividing wall adjacent to said one dividing wall not having said connector port;

a fluid passage in the sloped weir of at least one of the chambers of the series of adjacent chambers allowing for fluid transfer between adjacent chambers through the sloped weir of the at least one chamber, and in a chamber adjacent said at least one chamber the sloped weir not having said fluid passage; and an outlet in fluid communication with one of the chambers of the series of adjacent chambers outputting produced water.

2. The flotation tank of claim 1, wherein the connector port is positioned in a base of the dividing wall proximate the skimming weir.

3. The flotation tank of claim 1, wherein the interconnecting passage is positioned at one end proximate a base of the sloped weir and at the other end in proximity to a backside of the sloped weir of the adjacent chamber.

4. The flotation tank of claim 1, wherein the fluid passage is positioned proximate a base of the sloped weir.

5. The gas flotation tank of claim 1, wherein the fluid passage is a perforated plate in the sloped weir.

6. The flotation tank of claim 1, wherein the outlet is positioned proximate a base of the wall of the final chamber.

7. The flotation tank of claim 1, wherein the inlet is positioned in the first chamber.

8. The flotation tank of claim 1, wherein each set of adjacent chambers comprises either a connector port or a fluid passage in alternating format allowing for equalization of the fluid level in adjacent chambers while preventing short circuiting of the fluid through the tank to the final chamber.

9. The flotation tank of claim 6, further comprising a manifold in fluid communication with each chamber for inputting or withdrawing fluid from the tank.

10. The flotation tank of claim 1, wherein the sloped weirs of the tank are aligned with one another in the adjacent chambers.

11. The flotation tank of claim 1, wherein the sloped weirs of the tank are offset with one another in at least two of the adjacent chambers.

12. The flotation tank of claim 1, wherein an upper edge of the skimming weir comprises at least one notch to promote transfer of the unwanted phase into the skim oil trough.

13. The flotation tank of claim 1, further comprising an inlet in fluid communication with each chamber for injecting a gas into the chamber, optionally in the form of microbubbles.

14. The flotation tank of claim 1, wherein the contaminant comprises hydrocarbon, emulsified oils, or heavy oils.

15. The flotation tank of claim 1, wherein the fluid is produced water.

* * * * *